United States Patent [19]

Comparetti

[11] Patent Number: 4,653,433
[45] Date of Patent: Mar. 31, 1987

[54] FLEA ZAPPER

[76] Inventor: Joseph Comparetti, 23 Cedar Grove Ave., Lake Ronkonkoma, N.Y. 11779

[21] Appl. No.: 750,735

[22] Filed: Jul. 1, 1985

[51] Int. Cl.⁴ ............................................. A01K 13/00
[52] U.S. Cl. ..................................... 119/159; 604/58; 124/55; 239/526
[58] Field of Search ........................ 119/159; 401/171; 124/55; 222/4; 604/58, 61; 239/525, 526, 527, 528, 650, 659; 132/79 B, 82 B, 82 E, 82 G

[56] References Cited

U.S. PATENT DOCUMENTS

| 1,611,533 | 12/1926 | Kirsten | 124/55 |
| 2,478,715 | 8/1949 | Schmitt | 604/58 |
| 2,883,984 | 4/1959 | Candido, Jr. et al. | 604/61 |

Primary Examiner—Gene Mancene
Assistant Examiner—David I. Tarnoff
Attorney, Agent, or Firm—Richard L. Miller

[57] ABSTRACT

This invention is a hand operated powder dispenser, and includes a case having a powder chamber, and a trigger activated mechanism that slides a ram rod through the chamber to move the powder out a dispensing opening.

3 Claims, 3 Drawing Figures

FLEA ZAPPER

BACKGROUND OF THE INVENTION

This invention relates generally to powder dispensing devices. More specifically it relates to a flea powder dispenser dispensing device for applying directly amongst the fur hairs of an animal.

It is well known that numerous powder dispensing devices have been developed in the past for applying different powders among the fur hairs of animals, as is evident by the variety of applications presented in U.S. Pat. Nos.: 2,626,617 to Sullivan, 2,943,602, to Rundle, 4,213,423 to Bryan et al and the like. However all these devices appear to be comb or brush-like devices for spreading the powder through a wide area but wherein the applicators cannot be handled as efficiently as a gun-like device which with more ease and precision would direct a dispensing action into specific areas such as behind or into the ears or other narrow places where fleas hide.

SUMMARY OF THE INVENTION

Therefore it is a principal object of the present invention to provide a flea powder dispenser which is conveniently trigger operated and is designed to readily reach into all fur areas where fleas might be lodged.

Another object is to provide a flea powder dispenser which may be manufactured for use on household pets such as cats or dogs or else for applying medicated powder on farm stock.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawing are briefly described as follows.

DETAILED DESCRIPTION OF THE PREFERRED EMBODIMENTS

Figure 1:
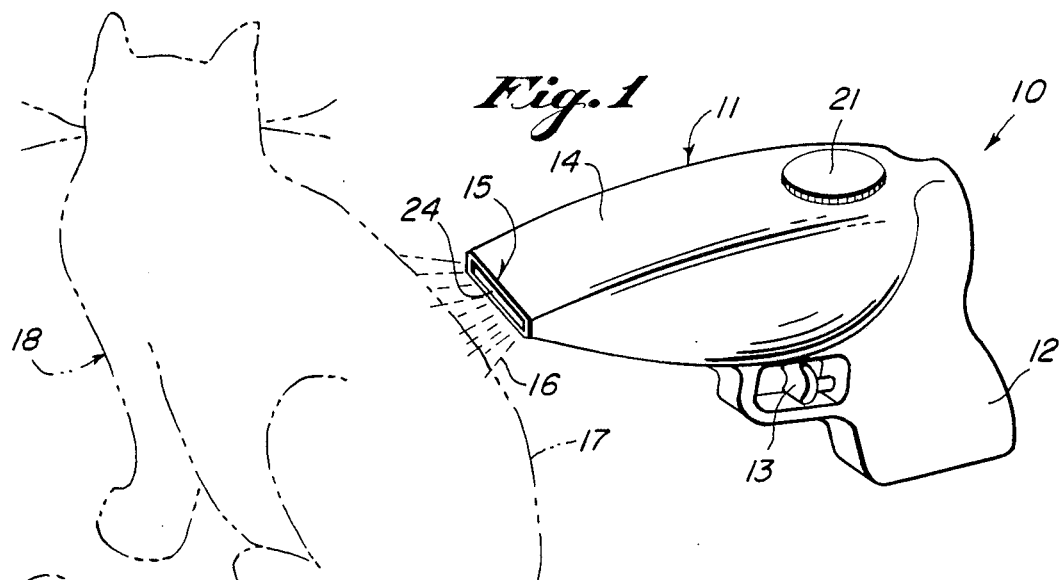
FIG. 1 is a perspective view of the invention shown in use.

Referring now to the drawing in greater detail, the reference numeral 10 represents a flea zapper, according to the present invention, wherein there is a streamlined, molded case 11 shaped like a hand gun for convenient handling. The case includes a pistol type handle portion 12 for wrapping a hand therearound while a finger of the hand operates a trigger 13 located under a barrel portion 14 of the case. A wide, narrow opening 15 on the tapered end of the barrel portion serves to dispense flea powder 16 directly into a fur 17 of an animal 18.

Figure 2:
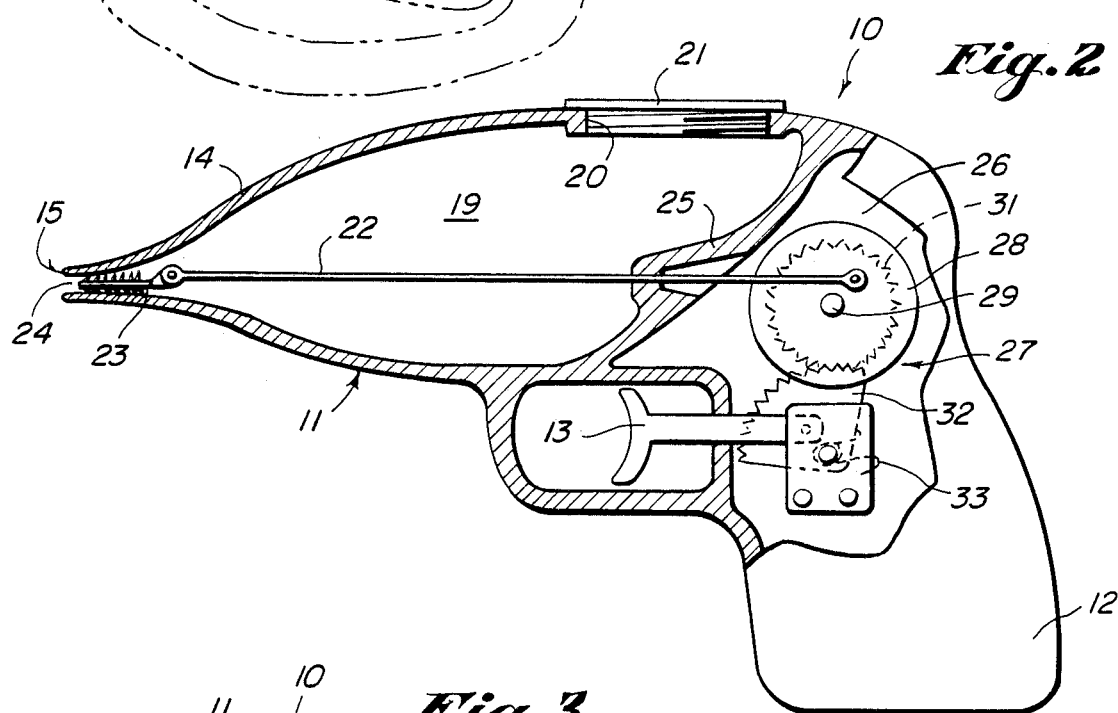
FIG. 2 is a side elevational view thereof, shown partly in cross section.
Figure 3:
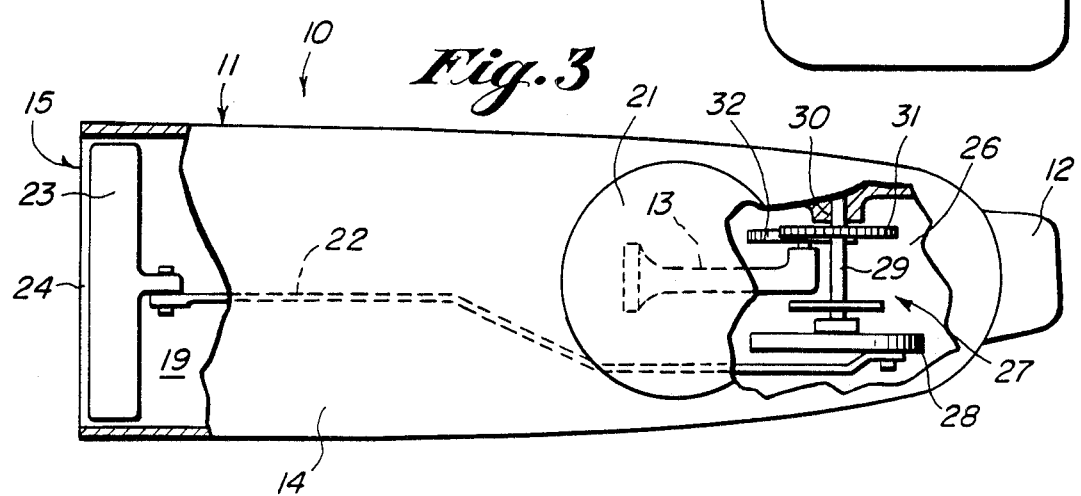
FIG. 3 is a top view thereof shown partly broken away and in cross section.

The barrel portion contains a powder chamber 19 into which powder is loaded through a filler opening 20 closable by a removable screw cap 21. A flexible ram rod 22, slidable inside the chamber, includes an agitator feeder 23 on its forward end which is slidable into the dispensing opening vestibule 24 for pushing outwardly a portion of the powder that gets in front thereof. The agitator feeder is approximately a same width as the opening for accomplishing this. As shown in FIG. 2, it may additionally include VELCRO ®-like fibers on its opposite sides for picking up powder when slided rearwardly inside the chamber and which when slided into the opening vestibule are forced to bend down so that when pushed slightly outwardly ahead of the opening, the fiber flip into normally straightened condition, causing the powder to be scattered ahead therefrom and among the fur. The rear end of the ram rod extends through an opening of a rear wall 25 of the chamber and into a hollow compartment 26 inside the handle portion which houses a mechanism 27 operated by the trigger.

The ram rod is pivoted to an eccentric location on a flywheel 28 mounted on a shaft 29 supported rotatively in a bearing 30. A gear 31 mounted also on the shaft, engages a pivotable sector gear 32 activated by the trigger when depressed. A return spring 33 returns the mechanism back to a start position after each operation of the trigger.

In use, the device conveniently applies flea powder where aimed on the animal.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A flea powder zapper dispenser, comprising, in combination, a case having a pistol type handle portion, and a barrel portion, a flea powder storage chamber in said barrel portion, and a mechanism in said handle portion for taking some flea powder from the storage chamber and transporting it through the barrel portion to a dispensing opening at the front of said case, and including means for mechanically spewing the flea powder from said dispensing opening, said means for mechanically spewing comprises a plurality of reciprocating fibers for receiving said powder and sized so that said fibers have a height greater than the height of said dispensing opening, whereby said fibers are bent downwardly as they pass through said opening and return to a straightened condition as they extend beyond said opening to spread, spew and disperse said powder.

2. The combination as in claim 1, wherein said mechanism comprises a reciprocating ram rod extending through said chamber and including a feeder end having said fibers mounted thereon and movable from within said storage chamber and through said dispensing opening and slightly therebeyond, and whereby said fibers can pick up some of the powder and transport it through said dispensing opening to spew the powder from the dispensing opening.

3. The combination as set forth in claim 2, and comprising a finger operated trigger in said handle portion which drives said mechanism.

* * * * *